United States Patent [19]
Byers

[11] Patent Number: 5,327,062
[45] Date of Patent: Jul. 5, 1994

[54] PRECISION DRIVE ASSEMBLY FOR TELESCOPES AND OTHER INSTRUMENTS

[76] Inventor: Edward R. Byers, 29001 W. Highway 58, Barstow, Calif. 92311

[21] Appl. No.: 767,212

[22] Filed: Sep. 30, 1991

[51] Int. Cl.⁵ .................. G05B 19/06; G05B 19/19
[52] U.S. Cl. ......................... 318/687; 74/89.15
[58] Field of Search .............. 74/89.15, 424.8 R; 318/687

[56] References Cited

U.S. PATENT DOCUMENTS

| | | | |
|---|---|---|---|
| 3,063,298 | 11/1962 | Elliott | 74/89.15 |
| 3,614,898 | 10/1971 | Paine | 74/89.15 |
| 4,282,763 | 8/1981 | Griebeler | 74/89.15 |
| 4,513,235 | 4/1985 | Acklam et al. | 318/687 X |
| 4,522,078 | 6/1985 | Fukuta | 74/89.15 |
| 4,764,881 | 8/1988 | Gagnon | 364/559 |
| 4,878,394 | 11/1989 | Nakamura et al. | 74/493 |
| 4,919,523 | 4/1990 | Burr | 350/567 |
| 5,077,561 | 12/1991 | Gorton et al. | 342/359 |

*Primary Examiner*—William M. Shoop, Jr.
*Assistant Examiner*—Brian Sircus
*Attorney, Agent, or Firm*—Keith D. Beecher

[57] ABSTRACT

A precision drive assembly for producing constant accurate angular motion of an instrumentality about an axis and which includes a lead screw and a nut threaded to the lead screw. The lead screw is driven by a motor. A radial (tangent) arm is coupled in one end to the nut and at the other end to the instrumentality so that linear movement of the nut along the lead screw causes the radial arm to turn the instrumentality about its axis. Position-rate errors inherent in the drive assembly are corrected by mechanical cam means, or by electric/electronic drive means motor.

3 Claims, 4 Drawing Sheets

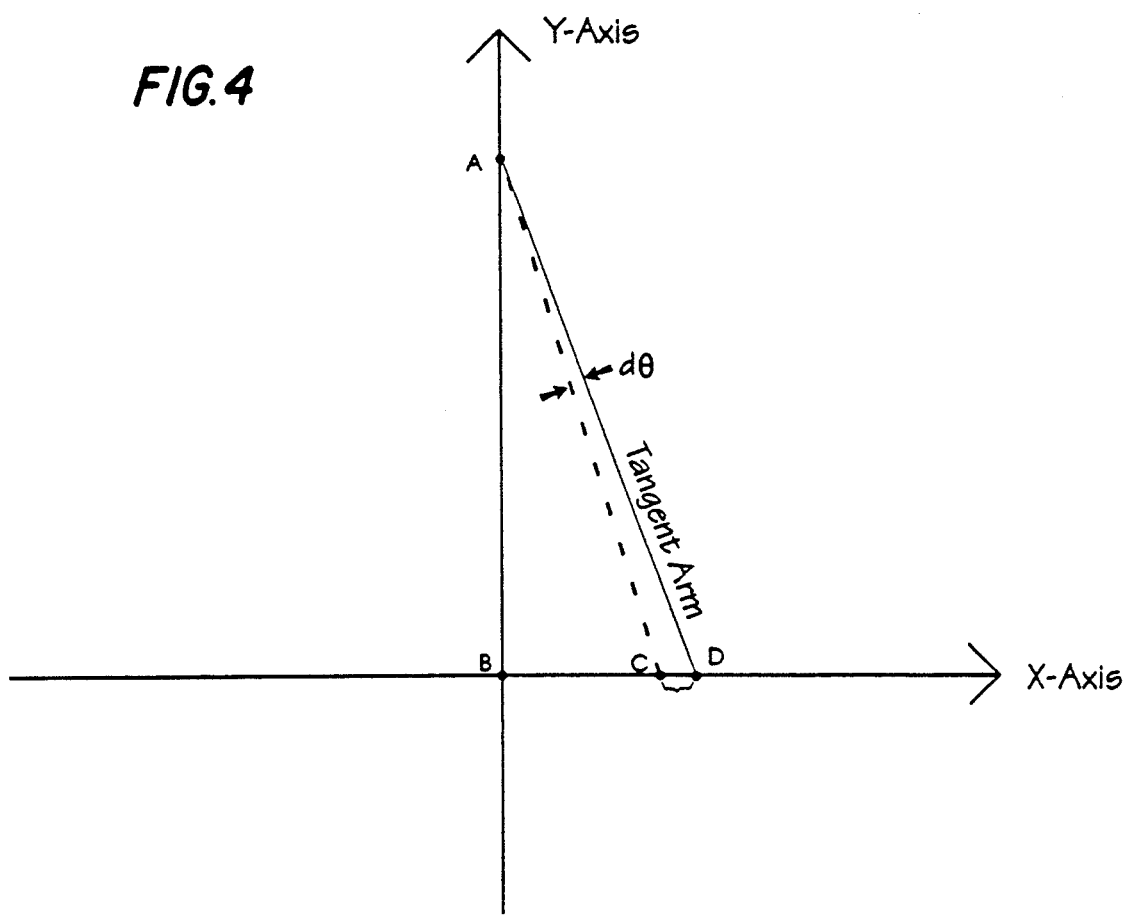

PRECISION DRIVE ASSEMBLY FOR TELESCOPES AND OTHER INSTRUMENTS

BACKGROUND OF THE INVENTION

There are many instances in which the need arises to turn an instrumentality about a selected axis and through a predetermined arc with a high degree of precision. Such instances include, for example, a telescope drive system by which rotation of the earth is effectively cancelled for astronomical observations; a device for precisely setting angular positions of optical elements in a laser system; and other angular drives which require precise indexing and/or tracking.

A common prior art drive for the purposes outlined above is the precision worm/worm gear drive. However, this type of drive is subject to a number of inherent errors. For example, the worm/worm gear drive is subject to a periodic error caused by deviations in the helical path of the worm thread. These deviations cause a sinusoidal error to occur with every revolution of the worm. This sinusoidal error is especially troublesome in astronomical observations because it causes star images formed by long-exposure photographs to become blurred and unsuitable for scientific study.

Another source of error found in precision worm gear drives, as well as in precision spur gear drives, is tooth-to-tooth position discrepancies of the gear. Also, back lash errors sometimes occur which are caused by clearance between the drive worm threads and gear teeth, or spur gear teeth, and the teeth of the driven gear.

BRIEF SUMMARY OF THE INVENTION

The drive assembly of the present invention is a tangent-arm type which includes a nut threaded to a lead screw which is driven by an appropriate motor. The lead screw, in turn, drives a radial arm which is affixed to an instrumentality at its remote end, and which serves to turn the instrumentality through a predetermined arc about a selected axis. Means is incorporated into the assembly to compensate for position/rate error which is a function of the tangent of the angle between the radial arm and the axis of the lead screw. The drive assembly of the invention eliminates the errors discussed above, because, unlike the worm threads which contact the worm-gear teeth only on one side of the worm, and which only have one or two threads in full contact with the worm-gear at any one time, the nut of the tangent-arm drive assembly of the invention completely surrounds the threads of the lead screw.

Accordingly, periodic errors encountered in the prior art worm/worm gear drives are eliminated, as well as tooth-to-tooth position error and back-lash error encountered in the prior art worm/worm gear drive assemblies and in the prior art spur gear drive assembly.

Another drawback in the prior art precision gear type of drive assemblies discussed above is that, as the size of the precision gear is increased, the cost increases significantly and sometimes prohibitively. The tangent-arm drive assembly of the present invention, on the other hand, may be made in larger sizes with only a modest increase in cost, as compared with the smaller sizes.

As mentioned above, the lead screw/nut of the tangent-arm drive assembly of the invention produces a position/rate error which is a function of the tangent of the angle between the radial arm and the axis of the lead screw. This position/rate error is corrected in the drive assembly of the invention by mechanical or electronic means, as will be described.

BRIEF DESCRIPTION OF THE DRAWINGS

FIG. 4 is a diagram illustrating calculations for the electric compensating means of FIG. 2.

DETAILED DESCRIPTION OF THE ILLUSTRATED EMBODIMENTS

Figure 1:
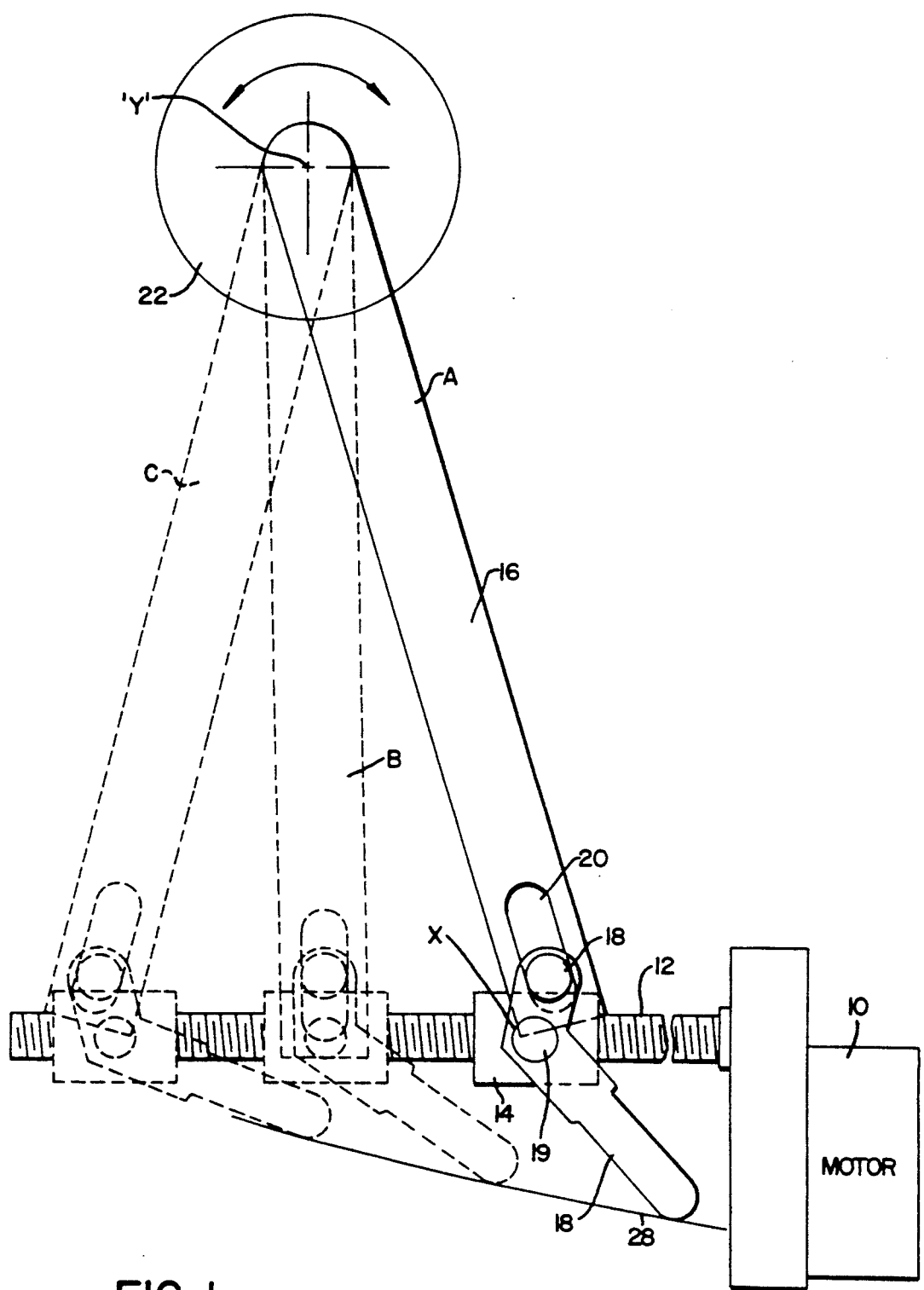
FIG. 1 is a schematic representation of a drive assembly constructed in accordance with one embodiment of the invention, and which includes mechanical means for compensating position-rate errors.

The precision drive assembly shown in FIG. 1 includes a motor 10 which drives a lead screw 12. A nut 14 is threaded to the lead screw, and the nut is coupled to a radial tangent arm 16 through a cam arm 18.

Cam arm 18 is rotatably mounted on a stub shaft 19 which is affixed to nut 14 for angular movement about a pivot axis X. The upper portion of the cam arm 18 is inclined to the remaining lower portion, and the upper portion is rotatably mounted on a shaft 18 which is received in a slot 20 at the lower end of the tangent arm 16.

The upper end of the tangent arm 16 is connected to an instrumentality 22, such as a telescope, to turn the instrumentality about an axis Y through a predetermined arc. The instrumentality 22 is turned about axis Y in either direction, depending upon the direction of which motor 10 drives the lead screw 12. The cam arm 18 engages a cam surface 28, and moves along the cam surface as the nut 14 moves the lead screw 10 from position A of the tangent arm through position B and to position C.

As nut 14 travels along the lead screw 12, the cam arm 18, in contact with the cam surface 28 will pivot about axis X, thereby causing the tangent arm 16 to move ahead of the nut 14. This mechanical cam system corrects the actual position of tangent arm 16 through the travel of nut 14 on lead screw 12 so as to maintain a constant angular position-to-linear position ratio. Thus, a linear to angular conversion is achieved, maintaining constant angular rate of the instrumentality 22 about axis Y. The shape of cam surface 28 to maintain such constant angular position-to-linear position ratio is determined by computational analysis.

Figure 2:
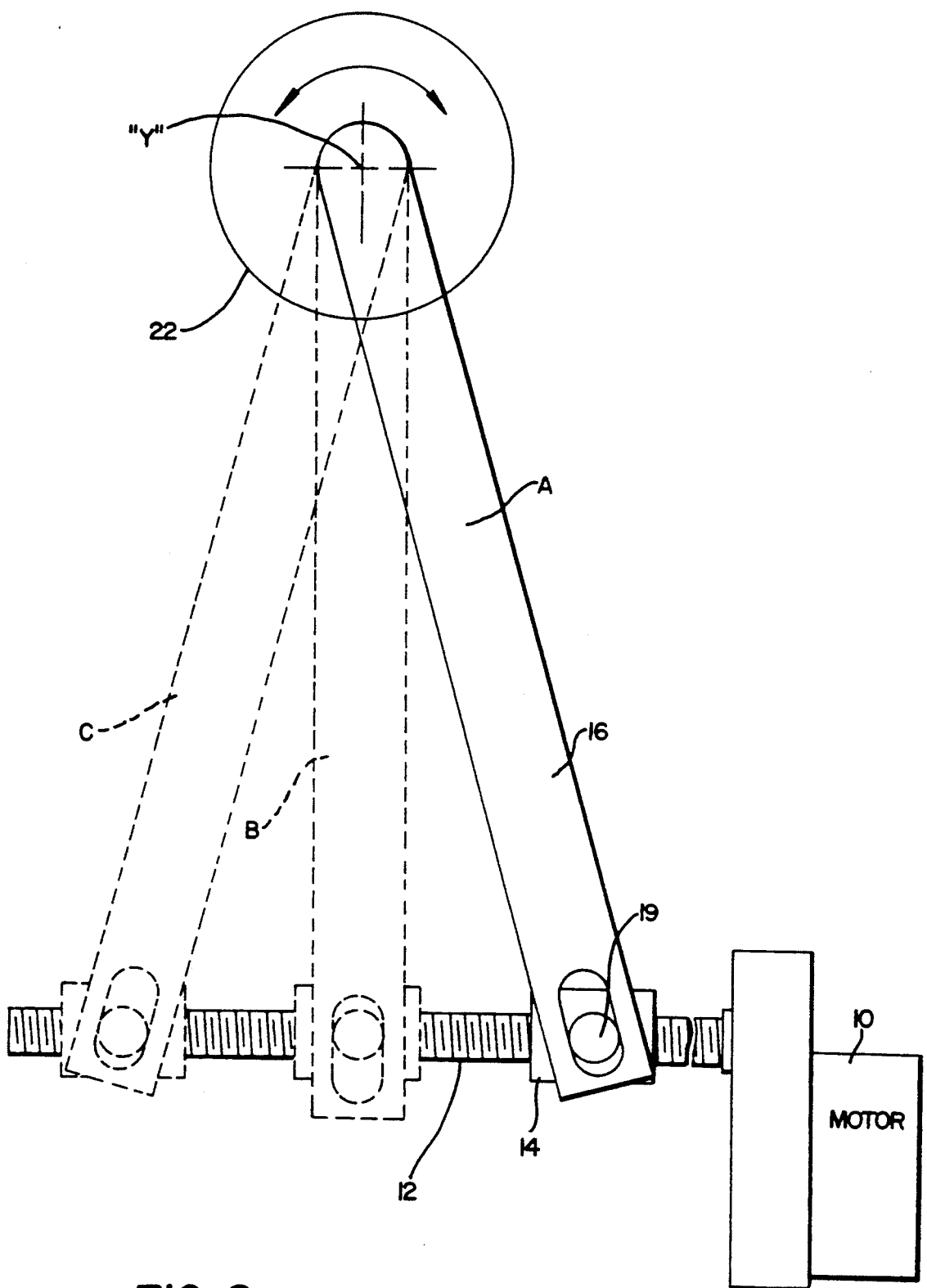
FIG. 2 is a schematic representation of a second embodiment, which includes electric or electronic means for compensating for position/rate errors.

The embodiment of FIG. 2 is generally similar to the embodiment of FIG. 1, and like components have been designated by the same numbers.

In the embodiment of FIG. 2, the cam arm 18 is eliminated, and the tangent arm 16 is directly coupled to the shaft 19 of nut 14.

As nut 14 travels along screw 12 in the embodiment of FIG. 2, an electronic cam corrects the location or rate of the nut on the screw. This is achieved by means of a stepping motor 10, or closed-loop motor, to correct the actual position of the tangent arm 16 through the travel of the nut on the lead screw 12 so as to maintain constant angular position-to-linear position ratio.

Thus, linear to angular conversion is achieved in the embodiment of FIG. 2, maintaining constant angular rate of instrumentality 22 about axis Y. These correction factors, like those of the mechanical cam of FIG. 1, are tangential in nature and can be derived through mathematical computations.

As described above, the mechanical cam system of FIG. 1 corrects the actual position of tangent or radial arm 16 against the position of nut 14 throughout the travel of the nut on lead screw 12 so as to maintain a constant angular position to linear position ratio. As the nut 14 travels at a constant rate along lead screw 12, cam follower 18 in contact with cam 28 causes the actual position of tangent arm 16 to be changed, correcting for the tangent error.

Figure 3:
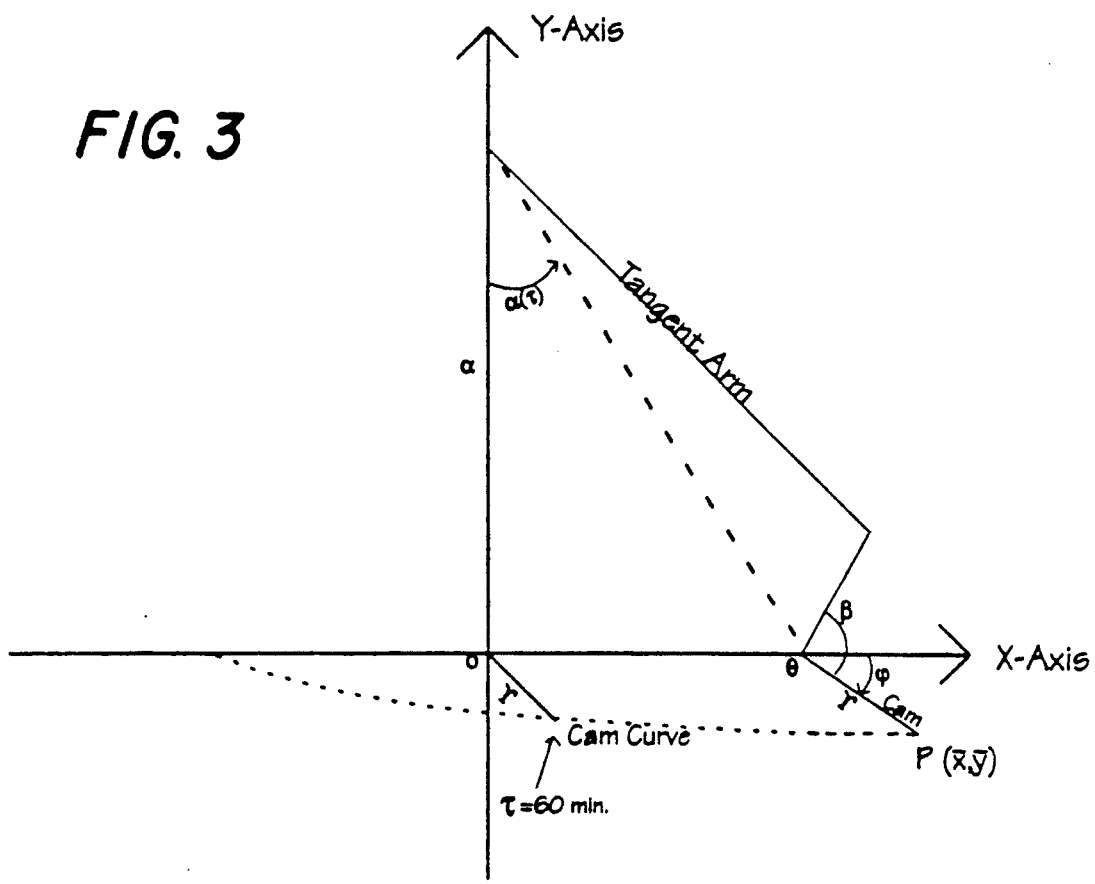
FIG. 3 is a diagram illustrating the manner in which the mechanical compensating means of FIG. 1, may be designed.

The correct curvature of cam 28 to achieve the desired correction may be determined by computational analyses in accordance with the graphic representation illustrated in FIG. 3. This computational analyses takes all of the necessary factors into account, and is as follows:

$$(-)\, d\alpha(\tau) + d\phi(\tau) = w d\tau \text{(circular motion with constant angular velocity } w\text{)}$$

$\alpha$ = Length of Tangent Arm
$\gamma$ = Length of Cam
$\phi$ = Position Angle of Cam
$O\theta$ = Distance of Center of Cam Plate from O-position of Tangent Arm, = x(t)
$\beta$ = Fixed Angle
$\nu$ = Travel/Minute $$\left( \frac{d\phi}{d\tau} \text{ will decrease from 0–60 min., then increase again} \right)$$

$$x = x_o - \nu\tau = a \tan\alpha(\tau);\ \alpha(\tau) = \tan^{-1}\left( \frac{x_o - \nu(\tau)}{a} \right)$$

Cam Curve, with coordinates $(\bar{x},\bar{y})$, has this representation:

$$x(\tau) = \lambda(\tau) + \gamma\cos\phi(\tau)$$

$$y(\tau) = \lambda(\tau) - \gamma\sin\phi(\tau)$$

where $\phi(\tau) = \phi_o - \omega(\tau - \tau_o) + [\alpha(\tau_o) - \alpha(\tau)];\ 0 = \tau_o \le \tau \le 120$ minutes (This is a transcendental curve.)

In the embodiment of FIG. 2, an electronic "cam" corrects the actual position of nut 14 on lead screw 12 as a function of the linear position of the nut on the lead screw. The correcting factors, like the correcting factors of the mechanical cam, are tangential in nature and can be derived by mathematical computation. The desired corrections may be achieved by controlling motor 10, which in this case is a stepping motor.

The computer changes the time between each step of the stepping motor so as to maintain a constant angular velocity of instrumentality 22. The appropriate computations are shown graphically in FIG. 4, and are as follows:

$d\theta$ = Difference in angle between points C and D of screw
$V_a$ = Angular Velocity, Units per second.
Example: Siderial Rate = 0.004166 degrees/second
$dt$ = Time required for nut to travel between point C and D on screw $$dt = \frac{\tan^{-1}\left(\frac{AB}{BC}\right) - \tan^{-1}\left(\frac{AB}{BD}\right)}{V_a}$$

The computer may, for example, calculate the proper time for the next step as each step is completed. Or, as an alternative could be computed in advance and stored in a reference table.

The invention provides, therefore, a relatively simple and inexpensive drive assembly which transforms linear motion to accurate angular motion with a high degree of precision.

While a particular embodiment of the invention has been shown and described, modifications may be made, and it is intended in the claims to cover all modifications which come within the true spirit and scope of the invention.

I claim:

1. A precision drive assembly for turning an instrumentality about a particular axis through a predetermined arc, said assembly including: a drive motor; a lead screw coupled to said motor to be rotated thereby about the longitudinal axis of said lead screw; a nut threaded to said lead screw to be driven along said lead screw from one end thereof to the other depending upon the direction of rotation of said lead screw by said motor; a tangent arm connected at one end to said instrumentality to turn said instrumentality through said predetermined arc about said particular axis; means coupling the other end of said tangent arm to said nut so that movement of said nut along said lead screw causes said tangent arm to turn said instrumentality through said arc about said particular axis; and means for correcting angular position and rate errors of the instrumentality by controlling the relation between the position of said nut on said lead screw and the angular displacement of said instrumentality as a function of the tangent of the angle between said tangent arm and the longitudinal axis of said lead screw and in accordance with a predetermined mathematical formula.

2. A precision drive assembly for turning an instrumentality about a particular axis through a predetermined arc, said assembly including: a drive motor; a lead screw coupled to said motor to be rotated thereby about the longitudinal axis of said lead screw; a nut threaded to said lead screw to be driven along said lead screw from one end thereof to the other depending upon the direction of rotation of said lead screw by said motor; a tangent arm connected at one end to said instrumentality to turn said instrumentality through said predetermined arc about said particular axis; means coupling the other end of said tangent arm to said nut so that movement of said nut along said lead screw causes said tangent arm to turn said instrumentality through said arc about said particular axis; and means for compensating for discrepancies between the position of said nut on said lead screw and the angular displacement of said instrumentality, in which said tangent arm has a slot in said other end thereof, and said compensating means comprises a cam arm pivotally mounted on said nut, and a coupler mounted on one end of said cam arm and received in said slot and a cam positioned to be engaged the other end of said cam arm and having a surface shaped to maintain a constant angular rate of said instrumentality about said particular axis as said nut is driven along said lead screw at a constant linear rate.

3. A precision drive assembly for turning an instrumentality about a particular axis through a predetermined arc, said assembly including: a drive motor; a lead screw coupled to said motor to be rotated thereby about the longitudinal axis of said lead screw; a nut threaded to said lead screw to be driven along said lead screw from one end thereof to the other depending upon the direction of rotation of said lead screw by said motor; a tangent arm connected at one end to said instrumentality to turn said instrumentality through said predetermined arc about said particular axis; means coupling the other end of said tangent arm to said nut so that movement of said nut along said lead screw causes said tangent arm to turn said instrumentality through said arc about said particular axis; and means for compensating for discrepancies between the position of said nut on said lead screw and the angular displacement of said instrumentality, in which said motor is constructed to rotate said lead screw at selected variable rates so as to maintain a constant ratio of angular position of said instrumentality about said particular axis with respect to the linear position of said nut on said lead screw.

* * * * *